J. Manchester,

Animal Trap.

No. 95,920. Patented Oct. 19. 1869.

WITNESSES:
A. W. Almquist
D. Hinchman

INVENTOR:
J. Manchester
PER.
Wm m & Co.
att'ys

United States Patent Office.

JOEL MANCHESTER, OF NEW YORK, N. Y.

Letters Patent No. 95,920, dated October 19, 1869.

IMPROVED ANIMAL-TRAP.

The Schedule referred to in these Letters Patent and making part of the same.

To all whom it may concern:

Be it known that I, JOEL MANCHESTER, of New York, in the county of New York, and State of New York, have invented a new and useful Improvement in Animal-Traps; and I do hereby declare that the following is a full, clear, and exact description thereof, which will enable others skilled in the art to make and use the same, reference being had to the accompanying drawings, forming part of this specification.

This invention relates to new and useful improvements in traps for killing or destroying noxious animals; and consists in operating a lever by means of a coil-spring in such a manner that when the trap is sprung the animal is struck and killed, and the trap is automatically set for the next animal, and so that the operation may be repeated until the spring runs down or requires winding up, and also in placing the bait in a box of cup, the improvements having reference to an animal-trap, for which I received Letters Patent of the United States, dated the 4th day of February, 1868.

In the accompanying drawings—

Similar letters of reference indicate corresponding parts.

Figure 1:
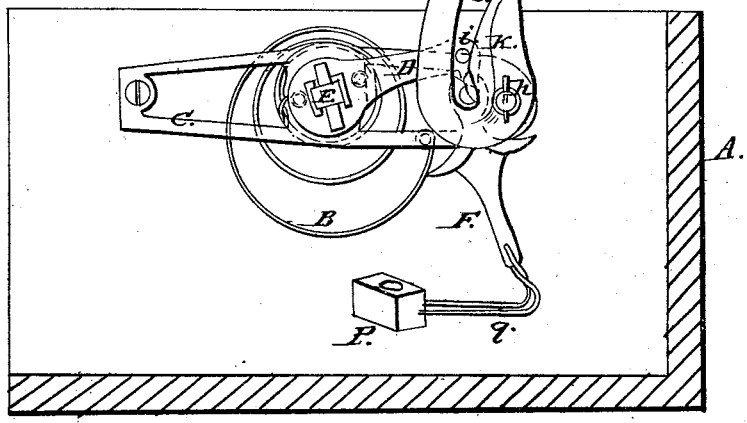
Figure 1 represents an elevation showing the trap as set.
Figure 2:
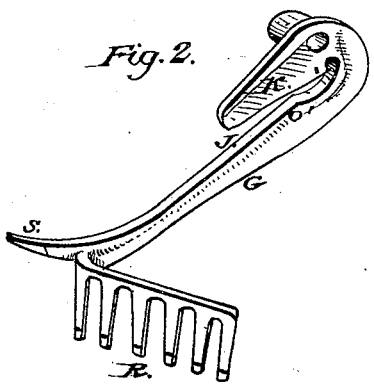
Figure 2 is a view of the lever detached.

As the present invention relates to the form and curves of the lever, and to the bait-box, it is not deemed necessary to give a general description of the trap, reference being made to the above-mentioned patent for that description.

A is the box or casing of the trap.

B is the coil-spring.

C is the frame attached to the box.

D is the crank or locking-arm on the central shaft E.

F is the bait-bar, to the upper end of which the arm D is hooked in setting the trap.

G is the lever or striking-arm, which is pivoted to the frame at $h$, the motion of which is governed by the pin $i$ in the end of the locking-arm D, by means of the slot J in the lever.

In setting the trap, the recoil of the spring bears the pin $i$ against the inner surface of the branch K, and to the bottom of the slot.

When at this point, the catches on the end of the bait-bar F, and on the arm D, have not yet engaged, the catch on the arm D is dropped down so as to allow of the rise of the pin $i$.

The pin rises, and, as it leaves the bottom of the slot, it is thrown, by the projection $o$, to the opposite side, (or surface $o'$, which destroys the momentum of the arm D,) and it finally rests, when the catches engage in the centre of the slot, as seen in the drawing, leaving the lever free.

By this arrangement the pin $i$ is relieved of its pressure against the lever or surface K, and consequently the momentum of the arm D is effectually arrested at a point immediately before the two catches meet together, therefore the catches may be much sharper or narrower, and require less movement of the bait-box to spring the trap.

When the trap is sprung, the first movement of the lever is downward. It will be seen that the end S of the lever extends beyond the claw R, and receives direct pressure from the spring at the moment of striking the animal, thereby requiring much less amount of spring than is necessary in my present patented trap, as the spring exerts more power at this point, and the blow is much more effectual in doing execution.

P represents the bait-box, which is attached to the bar F by the wire $q$. This box is placed so that the claws R of the lever G will strike a vital part of the body of the animal.

The bait (butter, lard, or other fatty substance) is placed in the bottom of the box, out of the reach of the animal. In his efforts to get it, the animal forces the box down and springs the trap, and is struck.

By placing the bait in a box or cup, I am enabled to use soft and tempting bait, but which can neither be destroyed or displaced by the animal, or by springing or setting of the trap.

As the lever is thrown up by the pin $i$ bearing against the inner surface of K, which motion is instantaneous, the animal is thrown clear of the trap, while the trap is set again ready for another animal. This operation will be repeated until the springs require winding up.

The spring is wound up by removing the lever and turning the arm D.

Having thus described my invention,

I claim as new, and desire to secure by Letters Patent—

1. The lever G, with the projections $o$, $o'$, and S, on the inner surface of the slot and end of the lever, substantially as and for the purposes set forth.

2. The bait-box P, constructed as described, when attached, by means of the wires $q$, to the bait-bar F, and arranged as herein set forth and shown, for the purpose specified.

The above specification of my invention signed by me, this 3d day of May, 1869.

JOEL MANCHESTER.

Witnesses:
FRANK BLOCKLEY,
C. L. TOPLIFF.